(12) United States Patent
Rike

(10) Patent No.: US 9,046,405 B2
(45) Date of Patent: Jun. 2, 2015

(54) LIQUID MODULATED ANTENNA

(71) Applicant: Roy Loxley Rike, Brunswick, ME (US)

(72) Inventor: Roy Loxley Rike, Brunswick, ME (US)

(73) Assignee: Roy L. Rike, Brunswick, ME (US)

( * ) Notice: Subject to any disclaimer, the term of this patent is extended or adjusted under 35 U.S.C. 154(b) by 305 days.

(21) Appl. No.: 13/815,597

(22) Filed: Mar. 12, 2013

(65) Prior Publication Data

US 2014/0260600 A1    Sep. 18, 2014

(51) Int. Cl.
*G01F 23/26* (2006.01)
(52) U.S. Cl.
CPC ..................... *G01F 23/261* (2013.01)
(58) Field of Classification Search
CPC ...................................... F06F 23/261
USPC ......... 340/500, 531, 539.1, 539.11, 540, 601, 340/665, 572.1, 572.3, 572.8, 572.5; 73/73, 73/290 R
See application file for complete search history.

(56) References Cited

U.S. PATENT DOCUMENTS

| 4,665,351 | A  | * | 5/1987 | Nyberg ......................... 318/483 |
| 7,421,887 | B2 | * | 9/2008 | Stackelhouse .................... 73/73 |
| 2006/0226985 | A1 | * | 10/2006 | Goodnow et al. .......... 340/572.1 |
| 2010/0134286 | A1 | * | 6/2010 | Potyrailo et al. .......... 340/572.1 |
| 2012/0001730 | A1 | * | 1/2012 | Potyrailo et al. ............. 340/10.1 |
| 2013/0154847 | A1 | * | 6/2013 | Potyrailo et al. .......... 340/856.3 |

* cited by examiner

*Primary Examiner* — Albert Wong

(57) ABSTRACT

One embodiment of a liquid-modulated antenna using an antenna of a type commonly used in the field of wireless identification which is placed within sufficient proximity of a source of liquid to allow the liquid to flow onto the antenna, thereby altering (modulating) the characteristics of the signal being transmitted from the antenna to a signal receiving unit.

19 Claims, 2 Drawing Sheets

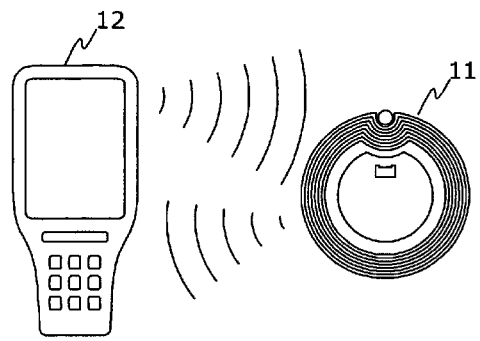
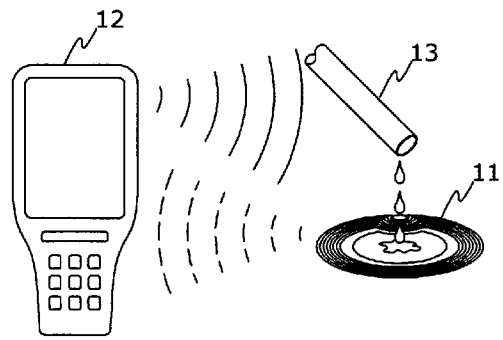
FIG. 1A    FIG. 1B
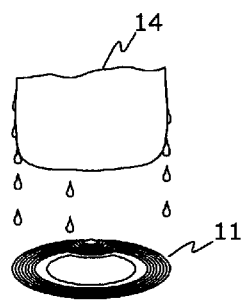
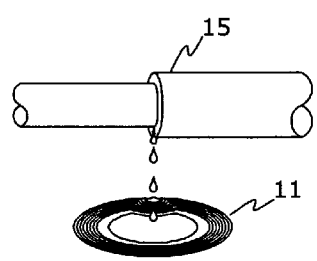
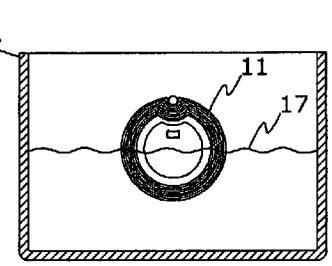
FIG. 2    FIG. 3    FIG. 4
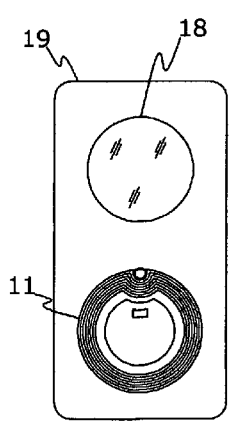
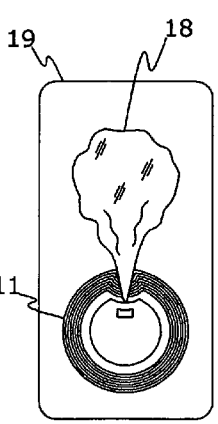
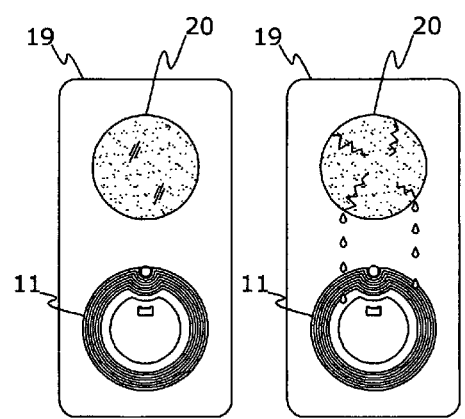
FIG. 5A    FIG. 5B    FIG. 6A    FIG. 6B

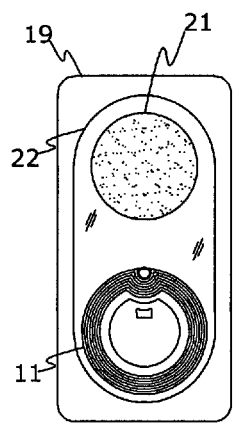
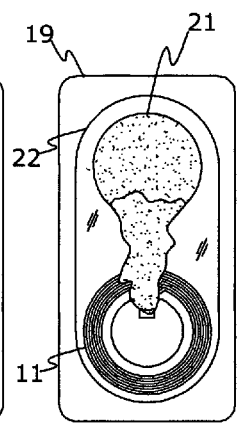
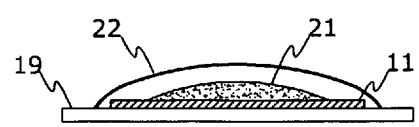
FIG. 7A  FIG. 7B  FIG. 7C
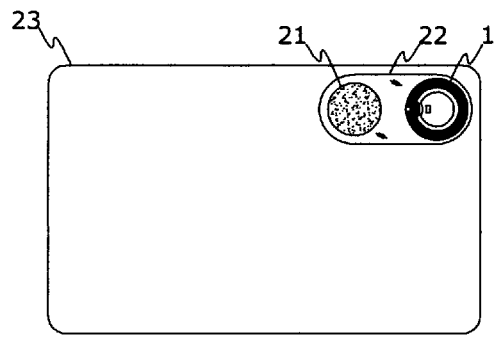
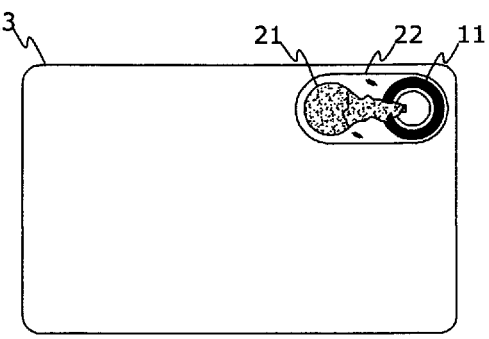
FIG. 8A  FIG. 8B
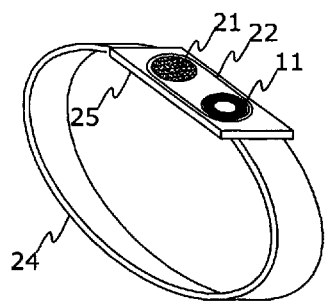
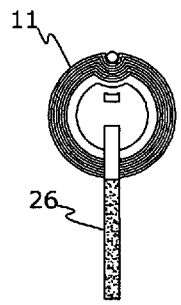
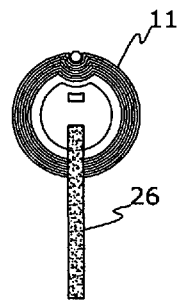
FIG. 9  FIG. 10A  FIG. 10B

LIQUID MODULATED ANTENNA

CROSS-REFERENCE TO RELATED APPLICATIONS

This application claims the previous benefit of provisional patent application Ser. No. 61/687,787, filed 2012 Apr. 30 by the present inventor. The content of that application is incorporated herein by reference.

BACKGROUND

Prior Art

An antenna, as any other electronic component, is conventionally designed to be isolated from all sources of moisture to prevent any interference with its performance. From a different perspective however, applying liquids to antennas as part of the normal operation of the antennas can lead to the construction of novel and simple devices which will increase and, in the wider scope and implications of such a process, lead to new hybrid wireless-fluid technologies. It is such an application of liquids to antennas which underlies the embodiments described in this application.

The term "modulation," which is conventionally used to refer to the encoding of one radio signal into a second signal to produce a third signal, is here used in the more general and prior sense of the term to mean the varying or altering of any one, or several, of the characteristics of a radio signal in order to convey information. In a liquid-modulated antenna, the liquid is the means of altering these characteristics. For the sake of clarity, and to avoid confusion of the process described with the more restricted identification of modulation with the combining of radio waves, signals will be described as "altered" rather than "modulated" throughout this application.

The electronic communication field of radio frequency identification (RFID) systems presents a commercial area in which several embodiments of the applicant's liquid-modulated antenna will be useful. RFID systems consist of RFID tag antennas, RFID readers set to match the signals of the antennas, and middleware connecting the two. Of special interest with respect to the embodiments is the type of RFID tag antenna known as the passive tag antenna which has no on-board power supply but draws the energy needed to generate a return signal from the energy transmitted to it by the RFID reader (hereafter called "the signal receiver") with which it is matched. This type of tag antenna is the one most widely used in the field of RFID because of its simple design and low cost. The embodiments described in this application employ a passive tag antenna (hereafter called "the antenna") in their construction.

To the knowledge of the applicant, no prior antenna has incorporated the application of a liquid as a component of its in-use operating mechanism, nor are there known any similar or related techniques of altering the signal of an antenna by intentionally applying a liquid to the antenna.

SUMMARY

An antenna, the characteristics of the transmitted signal of which are modulated by a source of liquid such that when the liquid is released onto the antenna, the signal being transmitted from the antenna to a device receiving the signal from the antenna will be altered and thereby inform the receiving device that a change of status has occurred with respect to an entity previously associated with the prior, un-modulated signal. The liquid-modulated antenna offers a simple, useful, and inexpensive method of augmenting current uses of antennas as these are applied to electronic information gathering in the fields of engineering, inventory control, delivery services, medicine, health and safety, and security.

The extensive range of commercial products potentially arising from this new feature of antenna design will be suggested by a consideration of the drawings and description which follow the introduction to liquid-modulated antennas given below. The introduction will proceed by way of a presentation of illustrative embodiments (a) through (g) as these can be applied to the field of RFID systems. The embodiments are introduced in order from the most simple to the most complex embodiments.

(a) The most simple type of embodiment of an RFID-based liquid-modulated antenna is constructed by placing the antenna where it can be contacted by liquid issuing from an intentionally constructed opening (e.g. the end of a tube, pipe, orifice), an unintended opening (leak), or as the result of an environmentally induced condition (e.g. condensation created by warming or the deposition of vapor). The antenna located below a dripping tube can function as a measuring device which indicates the rate of flow and quantity of the liquid deposited through the increasing alteration of the radio signal transmitted from the antenna to the signal receiver which occurs as the portion of the signal-transmitting area of the antenna uncovered by the liquid diminishes. The embodiment of (a) can also function in a simpler mode as a device having only the purpose of indicating that liquid is flowing. The embodiment of (a) used in combination with a hydraulic system can function as an alarm to indicate that a seal on the system has broken and that liquid is escaping. When combined with a liquid container, the embodiment of (a) can function as a level-indicator, the signal from the antenna undergoing increasing alteration as the rising level of liquid submerges an increasing portion of the transmitting area of the antenna. The embodiment of (a) when combined with a bag of frozen liquid, the antenna now being located below the bag, can indicate when the liquid of the bag is thawing: condensation forming on the outside of the thawing bag will drip onto the antenna, altering the signal returning to the signal receiver.

(b) In a more complex type of embodiment, the antenna is mounted on a substrate together with a piece of frozen liquid. This combination of the antenna and frozen liquid can function as a temperature alarm for an item to which it is attached, the frozen liquid thawing and then flowing onto the antenna when the temperature of the label rises above the freezing point of the liquid. Different freezing points for the apparatus can be set by employing liquids which have different freezing points.

(c) In a variant of the temperature sensor embodiment of (b), the piece of frozen liquid can be replaced with a liquid-filled cell, the membrane of which is designed to rupture at a specific air pressure, thereby allowing the embodiment of (c) to function as a pressure alarm as the liquid from the ruptured cell flows onto the antenna and alters the signal being sent to the signal receiver. The embodiment of (c) will be useful in monitoring the state of pressure-sensitive cargo being transported by airplane.

(d) In a variant of the pressure alarm embodiment of (c), the liquid-filled cell, antenna, and substrate are retained and to this combination of parts is added a cover of deformable material which covers the area of the substrate containing the cell and antenna. In the case of this embodiment of (d), the cell is ruptured manually (e.g. by being pressed between thumb and forefinger) or mechanically (e.g. by being passed between rollers), forcing the liquid contents of the cell onto the antenna. An apparatus so constructed can be affixed to an item for purposes of inventory tracking and control to indicate a change in the status of the item on the part of the person handling the item. If the handler observes, for example, a defect in the item, the handler can send an alarm to the signal receiver matched with the antenna of the apparatus by rupturing the cell, thereby spreading the liquid of the cell onto the antenna and altering the signal being sent to the signal receiver, creating the alarm when the signal being returned to the receiver fails to match that previously set on the receiver. As a result of the alarm, the item is withdrawn from the inventory stream. If the item affixed with the embodiment of (d) is a part or sub-assembly being delivered for installation on a larger assembly (e.g. computer, motor, jet engine), the person installing the part at the end of the delivery stream can rupture (hereafter called "activate") the apparatus as a means of informing the signal receiver matched with the antenna that the part has now been delivered and installed. Insofar as the embodiment of (d) can function as a kill-switch for the purpose of inventory tracking and control, the same combination of parts (liquid-filled cell, antenna, substrate, and deformable cover) can also function in a free-standing mode as, in effect, a wireless (RF) ticket. The holder of such a wireless ticket uses it for access until a ticket-taker voids the ticket by activating the cell, forcing the liquid onto the antenna and altering the signal being sent to the signal receiver, thereby cancelling the ticket for further use.

(e) In a variant of the substrate-mounted embodiment of (d), the same combination of cell, antenna, and cover can be mounted on other substrates such as identity cards where such a combination can be mounted alongside other information media conventionally carried on such cards (e.g. photograph, optical barcode, magnetic strip) in order to add another level of security. A security guard activates the cell by pressing the card between thumb and forefinger or by sliding the card through mechanical rollers, thereby cancelling the card. In a different role from that of cancelling the card, the activation of the cell can be used to provide a higher level of on-demand identity authentication for the card user: the same liquid which flows onto the antenna to alter the signal of the antenna is at the same time creating a "blot signature," a unique alteration of the antenna signal which necessarily results from the variable pattern and area of flow of the liquid over the antenna which occurs each time such a cell is activated. Such a random alteration of the signal creates what is, in effect, an on-demand password signature for the card holder for the time and place that the cell of the card is activated. This feature of the embodiment of (e) will be useful in restricted areas requiring high security levels. Beyond its application to identity cards, the embodiment of (e) can be applied to other documents such as passports.

(f) When the embodiment of (d) is mounted on a wristband, it can be worn as an alarm by medical patients and others who need to summon assistance. The wearer of the wristband can activate the cell, sending an altered signal to the signal receiver to indicate that assistance is needed.

(g) A related variant of the wristband embodiment of (f) is another type of liquid-modulated antenna patient alarm which is constructed by inserting the antenna into the end of a liquid-filled soft tube of sufficient length to rest comfortably in the mouth of the user between the teeth of the upper and lower jaws. The liquid, in this case a thick, viscous liquid or gel, fills the tube only as far as the edge of the inserted antenna. When the tube is inserted into the mouth with the antenna-end protruding, the apparatus is activated as an alarm by biting down on the tube, squeezing the liquid from the filled portion of the tube into the empty portion of the tube where the antenna has been inserted. When the previously uncovered area of the antenna lying within the tube becomes covered with the squeezed liquid, the signal being sent to the signal receiver is altered and indicates by the alteration that the user of the apparatus needs assistance. The embodiment of (g) will be useful to a person who cannot conveniently activate the patient alarm of embodiment (f) because of injuries to the hands.

DRAWINGS

Figures

In the drawings, closely related figures have the same number but different alphabetic suffixes.

FIG. 1A to 1B show a signal receiver and tag antenna exchanging radio signals, then the return of a weaker signal to the receiver as liquid drips onto the antenna from the end of a tube.

FIG. 2 shows a similar antenna placed below a bag of thawing liquid from which condensate is dripping in accordance with another embodiment.

FIG. 3 shows a similar antenna placed below a hydraulically operated piston from which liquid is leaking in accordance with another embodiment.

FIG. 4 shows a similar antenna partially submerged in a container of liquid in accordance with another embodiment.

FIG. 5A to 5B show pre-activation and post-activation views of a similar antenna mounted on a substrate together with a piece of frozen liquid in accordance with another embodiment.

FIG. 6A to 6B show pre-activation and post-activation aspects of a similar antenna mounted on a substrate together with a pressure-sensitive liquid-containing cell in accordance with another embodiment.

FIG. 7A to 7C show pre-activation, post-activation, and cross sectional views of a similar antenna which has been mounted on a substrate together with a liquid-containing cell and deformable cover in accordance with another embodiment.

FIG. 8A to 8B show pre-activation and post-activation views of a similar antenna mounted on a substrate together with a liquid-containing cell and deformable cover in accordance with another embodiment.

FIG. 9 shows a similar antenna mounted together with a liquid-containing cell and deformable cover on a wristband in accordance with another embodiment.

FIG. 10A to 10B shows pre-activation and post activation views of a similar antenna inserted into a partially liquid-filled tube in accordance with another embodiment.

REFERENCE NUMERALS

| 11 antenna | 12 signal receiver |
|---|---|
| 13 tube | 14 bag containing thawing liquid |
| 15 hydraulic piston | 16 liquid container |
| 17 liquid | 18 piece of frozen liquid |
| 19 first rectangular substrate | 20 air pressure sensitive liquid-filled cell |
| 21 liquid-filled cell | 22 deformable cover |
| 23 second rectangular substrate | 24 wristband |
| 25 mounting for cell/antenna/cover unit | 26 liquid-filled tube |

DETAILED DESCRIPTION

FIG. 1A to 1B

First Embodiment

An antenna 11, in this case a disc-shaped, passive tag antenna (an antenna having no onboard source of power) is shown first exchanging an unaltered radio signal with its matched signal receiver 12. The antenna is then shown placed flat, below the end of a tube 13 from which liquid is dripping onto the antenna, the accumulating liquid causing the antenna to return an altered signal to the signal receiver, signified in the figure by the broken line rendering of the signal returning to the signal receiver.

Operation—FIG. 1

The liquid-modulated antenna of the embodiment is operated by observing the alteration in the signal that the antenna transmits when a liquid deposited on the antenna, whether intentionally or unintentionally, alters the signal returning from the antenna to the signal receiver matched with the antenna. Response to the altered signal by the operator of the signal receiver will vary according to the specific application of the embodiment. In one case, the altered signal will activate an alarm; in another, it will indicate simply that liquid is flowing from the opening of the tube; in another, the regular and quantifiable alteration of the signal will indicate specific characteristics of the liquid flowing from the tube (e.g. quantity, viscosity) as it spreads over the surface of the antenna at a particular rate or in a particular manner. The antenna will need to be cleaned or replaced periodically if multiple uses are intended.

FIG. 2-4

Additional Embodiments

Additional "drip" embodiments are shown in FIGS. 2, 3, and 4. In each embodiment the antenna is located where liquid can flow onto the surface of the antenna: from the surface of a bag 14, as condensate (FIG. 2); from a piston 15, as hydraulic fluid (FIG. 3), from the rising level of liquid 17 within a container 16 (FIG. 4). FIGS. 2 and 3 show embodiments functioning as alarms: FIG. 2 for condensate dripping from the surface of a bag filled with a frozen item which is thawing; FIG. 3 for hydraulic fluid leaking from a piston having a broken seal. FIG. 4 shows an embodiment which functions as a meter, the altered signal returning from the antenna indicating that liquid rising within the container has reached a particular level.

The principle of the liquid-modulation of antennas which underlies the embodiment can be observed in an experiment conducted by the applicant using a pair of walkie-talkies: when the end of the exposed and straightened 10 centimeter-long copper wire antenna of the transmitting walkie-talkie was inserted by 1 centimeter increments into a line of gel, voltage readings taken at the amplifier of the receiving walkie-talkie decreased consistently by approximately 0.006 millivolts per centimeter of antenna inserted.

FIGS. 5-10

Alternative Embodiments

Several additional variants of the basic embodiment just described can be constructed using the same antenna 11 in different mountings as shown in FIGS. 5 to 10. FIGS. 5 and 6 show the antenna mounted on a first rectangular substrate 19 for environmental sensor applications. In FIG. 5 the antenna 11 is mounted on the first rectangular substrate together with a round piece of frozen liquid 18. If the temperature rises above the freezing point of the frozen liquid, the piece will melt and flow over the antenna (FIG. 5B), sending an alarm to the signal receiver 12. In FIG. 6, the antenna 11 is mounted on first rectangular substrate 19 together with a liquid-filled cell 20 the membrane of which will rupture at a known level of air pressure, causing the liquid to flow over the antenna (FIG. 6B), sending an alarm to the signal receiver 12.

In FIG. 7, the antenna 11 is mounted on the first rectangular substrate 19 together with a liquid-filled cell 21, both the antenna and cell being covered with a deformable plastic cover 22. This embodiment can be attached to items moving through an inventory system to note changes in the status of an item to which it is attached (e.g. the need to withdraw the item from the inventory stream should the handler of the item observe a defect in the item). The same embodiment and substrate can also be used in a free-standing mode un-affixed to an item to function as a wireless electronic admission ticket: the user retains such a ticket for access until a ticket-taker cancels the ticket by squeezing and rupturing the cell so that the liquid flows over the antenna and alters the signal being sent to the signal receiver.

In FIG. 8, the same combination of antenna, liquid-filled cell, and deformable cover of FIG. 7 is mounted on a second rectangular substrate 23 similar in size and shape to an identity card or credit card to show the manner in which a liquid-modulated antenna can augment information media of the type conventionally found on such cards (e.g. photograph, optical barcode, magnetic strip). The apparatus consisting of parts 11, 21, and 22 when mounted on the card can be activated to cancel the card, or, in a different role, to provide a unique identifying signal for the card user: the inherently random nature of the spreading of the liquid onto the antenna after the rupturing of the cell will result in the covering of a variable area of the antenna with the liquid and thereby cause the antenna to return a unique signal to the signal receiver 12. This unique identifying signal can be termed a "blot signature." These identity and security-based embodiments can also be applied to other substrates such as documents and passports.

FIGS. 9 to 10 show two embodiments that can function as patient alarms. In FIG. 9, the same combination of antenna, liquid-filled cell, and deformable cover of FIG. 7 is shown mounted on a wristband 24. The patient wearing the wristband-mounted embodiment summons assistance by manually activating the cell, the liquid of which flows onto the antenna 11 and alters the signal being sent to the signal receiver 12, thereby triggering an alarm. The embodiment shown in FIG. 10, antenna 11 inserted into the unfilled portion of a partially filled liquid tube 26, can function as an orally activated alarm for patients who cannot use their hands. After an attendant has placed the tube-end of the apparatus into the mouth of a patient, the patient can summon assistance by biting down on the tube: liquid from the filled portion of the tube is squeezed into the unfilled portion of the tube into which the antenna has been previously inserted and finally covers a portion of the antenna sufficient to alter the signal being sent from the antenna to the signal receiver. This embodiment will be useful to attendants who must leave a manually disabled patient temporarily unattended.

CONCLUSION, RAMIFICATIONS, AND SCOPE

Accordingly, the reader will see that the liquid-modulated antenna of the various embodiments can be used to create new and useful products by augmenting the current designs of antennas with a different design of antenna which does not isolate the antenna from liquids but deliberately uses liquids as active components in the construction and operation of the antenna.

Although the description of the embodiments in this application contains many specific details, these details should not be construed as limiting the scope of the embodiments but rather as providing illustrations of a group of several embodiments. For example, other antennas incorporating liquid-modulation in their construction may use antennas which differ in design from the example of the disc-shaped passive tag antenna used to illustrate the embodiments in this application. Thus the scope of the embodiments should be determined by the appended claims and their legal equivalents rather than by the examples given.

I claim:

1. A device for detecting a change in conditions comprising:
    an RFID circuit, having an antenna, mounted to a substrate;
    a fluid-filled cell co-located on the substrate and separate from the antenna; and
    a passage for allowing the fluid inside the cell to flow from the cell onto the antenna to alter the response from the RFID circuit when the fluid flows out of the cell and onto the antenna.

2. The device in claim 1, wherein the fluid is a liquid or a gel.

3. The device in claim 1, wherein the fluid flow out of the cell when the cell is ruptured.

4. The device in claim 3, wherein the cell is ruptured by the application of pressure.

5. The device of claim 1, wherein the fluid is in a frozen state and flows when the frozen fluid melts.

6. The device of claim 1, wherein the cell includes a deformable surface.

7. A method of forming an fluid detecting device, comprising:
    forming an RFID circuit, having an antenna, onto a substrate;
    co-locating a fluid-filled cell on the substrate and separate from the antenna; and
    forming a passage between the fluid in the cell and the antenna to alter the response from the RFID circuit when the fluid flows out of the cell and onto the antenna.

8. The method of claim 7, wherein the fluid is a liquid or a gel.

9. The method claim 7, wherein the fluid flow out of the cell when the cell is ruptured.

10. The method of claim 9, wherein the cell is ruptured by the application of pressure.

11. The method of claim 7, wherein the fluid is in a frozen state and flows when the frozen fluid melts.

12. The method of claim 1, wherein the cell includes a deformable surface.

13. A system for detecting a change in conditions, comprising:
    an RFID circuit, having an antenna, mounted to a substrate;
    a fluid-filled cell co-located on the substrate and separate from the antenna;
    a passage for allowing the fluid inside the cell to flow from the cell onto the antenna to alter the response from the RFID circuit when the fluid flows out of the cell and onto the antenna; and
    a reader for interrogating the RFID circuit and determining an abnormal condition when the response from the RFID circuit antenna indicates that fluid has flown onto the antenna.

14. The system in claim 13, wherein the fluid is a liquid or a gel.

15. The system in claim 13, wherein the fluid flow out of the cell when the cell is ruptured.

16. The system in claim 15, wherein the cell is ruptured by the application of pressure.

17. The system of claim 13, wherein the fluid is in a frozen state and flows when the frozen fluid melts.

18. The system of claim 13, wherein the cell includes a deformable surface.

19. The system of claim 13, wherein the abnormal condition is indicative of a deactivated RFID circuit.

* * * * *